US 6,608,410 B2

(12) United States Patent
Sato et al.

(10) Patent No.: US 6,608,410 B2
(45) Date of Patent: Aug. 19, 2003

(54) MOTOR HAVING SHAFT-GROUNDING ARRANGEMENT

(75) Inventors: Toshihiro Sato, Toyohashi (JP); Shuuichi Gonda, Toyohashi (JP)

(73) Assignee: Asmo Co., Ltd., Shizuoka (JP)

( * ) Notice: Subject to any disclaimer, the term of this patent is extended or adjusted under 35 U.S.C. 154(b) by 0 days.

(21) Appl. No.: 09/788,542

(22) Filed: Feb. 21, 2001

(65) Prior Publication Data

US 2001/0017495 A1 Aug. 30, 2001

(30) Foreign Application Priority Data

Feb. 29, 2000 (JP) ........................................ 2000-054701
Sep. 25, 2000 (JP) ........................................ 2000-290878

(51) Int. Cl.[7] ............................ H02K 61/67; H02K 5/16
(52) U.S. Cl. .................. 310/67 R; 310/68 R; 310/67 R; 310/79; 310/81
(58) Field of Search ............................... 310/67 R, 79, 310/81, 239, 68 R

(56) References Cited

U.S. PATENT DOCUMENTS

| 4,920,289 A | * | 4/1990 | Saito ........................... 310/90 |
| 6,078,117 A | * | 6/2000 | Perrin ........................ 310/68 R |

FOREIGN PATENT DOCUMENTS

| JP | U-9355 | * | 2/1994 | .......... H02K/5/167 |
| JP | 07-284240 | | 10/1995 | |

* cited by examiner

Primary Examiner—Joseph Waks
Assistant Examiner—Iraj A. Mohandesi
(74) Attorney, Agent, or Firm—Posz & Bethards, PLC

(57) ABSTRACT

A DC motor has a conductive case and an arrangement for electrically connecting the shaft and case of the DC motor that is grounded. The arrangement includes a conductive member and a pressing member that presses the conductive member against the shaft, thereby grounding the shaft.

9 Claims, 10 Drawing Sheets

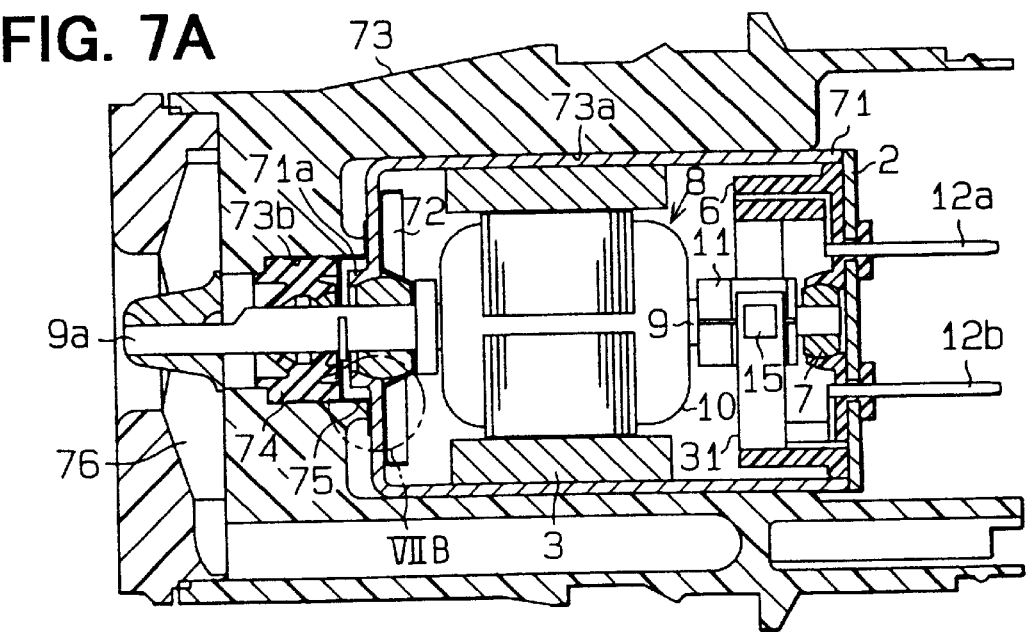
FIG. 7A
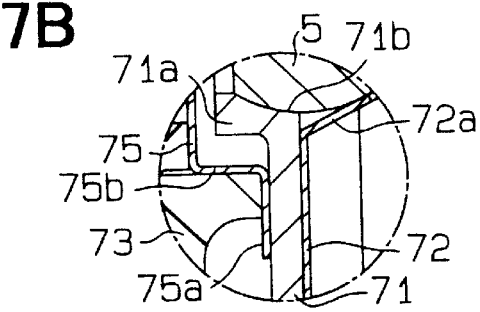
FIG. 7B
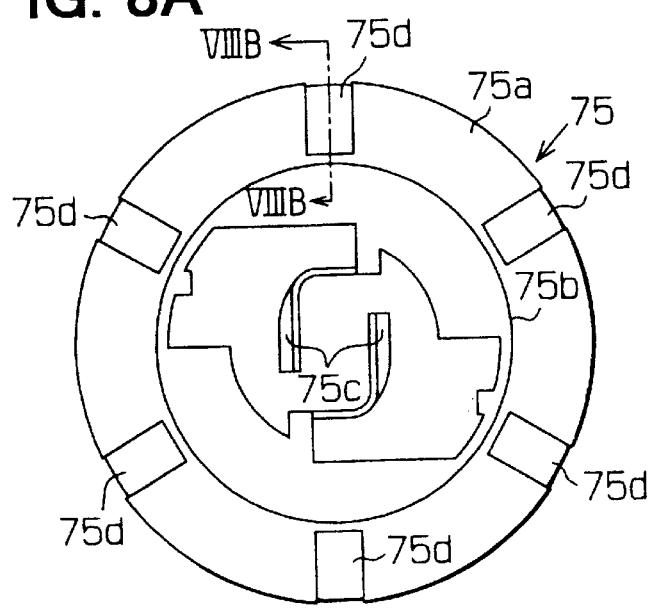
FIG. 8A
FIG. 8B

MOTOR HAVING SHAFT-GROUNDING ARRANGEMENT

CROSS REFERENCE TO RELATED APPLICATION

The present application is based on and claims priority from Japanese Patent Application 2000-054701, filed Feb. 29, 2000 and 2000-290878, filed Sep. 25, 2000, the contents of which are incorporated herein by reference.

BACKGROUND OF THE INVENTION

1. Field of the Invention

The present invention relates to an electric motor for a vehicle or an acoustic device.

2. Description of the Related Art

An ordinary electric motor for a vehicle such as a windshield wiper motor or a washer pump motor has a noise suppressing circuit that is comprised of a pair of noise suppressing coils and a capacitor. The noise suppressing circuit is effective to reduce electromagnetic noises generated at a commutator of the motor. However, if such the motor employs a pair of resinous bearing holders for supporting a pair of bearings that rotatably supports a shaft of a rotor, the resinous bearing holders electrically insulate the shaft from a ground. As a result, electro-magnetic noises may be radiated from an end of the shaft that extends from a case of the motor.

JP-U-6-9355 discloses an arrangement of grounding a shaft. In the arrangement, a metal bearing is in direct contact with a yoke that is grounded.

However, if the shaft is vibrated in the radial direction of the motor, the contact between the metal bearing and the yoke may be broken repeatedly, and the electro-magnetic noises cannot be effectively reduced.

SUMMARY OF THE INVENTION

A main object of the invention is to provide an electric motor that has an improved arrangement for reducing such electro-magnetic noises.

According to a main feature of the invention, a motor includes a conductive case, a member for grounding said case, a shaft and means for pressing a conducting member between the shaft and the case.

Therefore, the contact between the shaft and the case may not be broken even if the shaft is vibrated repeatedly.

The means may include a resilient contact member integrated with the case.

The means may include a conductive bearing holder fixed to the case and having a resilient contact member in contact with the bearing.

The means may include a magnetic core and a permanent magnet disposed to generate a magnetic force to press the contact member against the bearing.

The means may also include a spring washer held between the bearing and a collar formed on the shaft or a bearing-holding washer having a resilient projecting member.

The means may include a oil seal made of a conductive material.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

FIG. 7A is a cross-sectional view of a main portion of a DC motor according to a sixth embodiment of the invention, and FIG. 7B is a fragmentary enlarged view of a contact member of the DC motor according to the sixth embodiment;

FIG. 8A is a front view of the contact member of the DC motor according to the sixth embodiment, and FIG. 8B is a fragmentary enlarged cross-sectional side view of a main portion of the contact member;

DETAILED DESCRIPTION OF THE PREFERRED EMBODIMENTS

Figure 1:
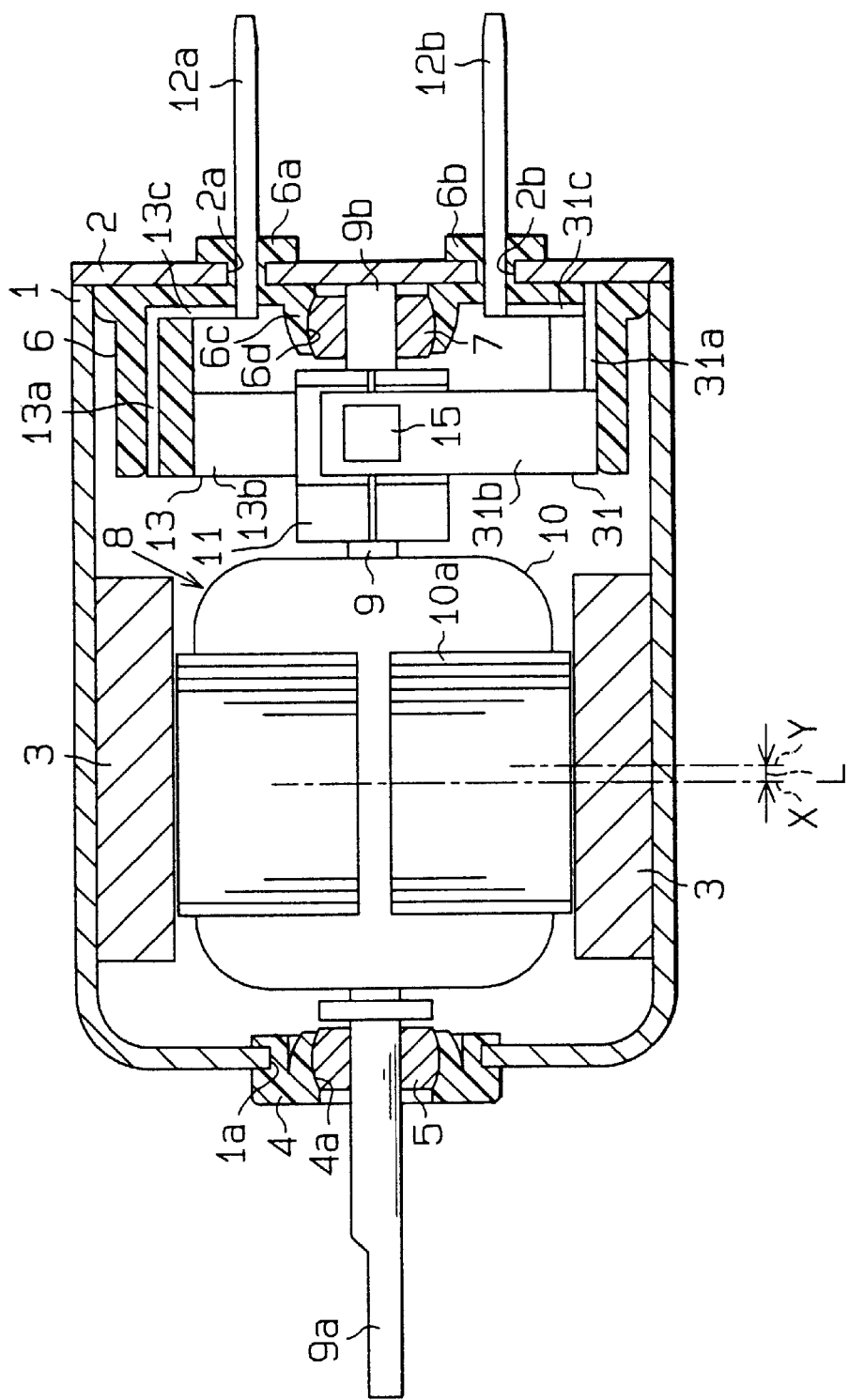
FIG. 1 is a cross-sectional view of a main portion of a DC motor according to a first embodiment of the invention.

A DC motor according to a first embodiment of the invention is described with reference to FIG. 1. The DC motor has a cup-shaped cylindrical motor case 1 and a disk-shaped cover 2, both of which are made of a conductive metal member. A plurality of permanent magnets is disposed in the motor case 1. A through hole 1a is formed at the center of the motor case 1, and a resinous bearing holder 4 is fitted to the through hole 1a. The bearing holder 4 has a spherical inside surface 4a whose diameter increases toward the axial center thereof. A bearing 5 is disposed inside the spherical inner surface. The bearing 5 is an oil retaining bearing made of a porous sintered alloy and has a spherical outside surface that is fitted to the spherical inside surface 4a of the bearing holder 4.

The cover 2 has a pair of through holes 2a and 2b formed at symmetric portions away form the center thereof. An injection-molded resinous support member 6 is fixed to the inside surface of the cover 2. The support member 6 has a pair of terminal holders 6a and 6b that project outward through the pair of through holes 2a and 2b and a bearing holder 6c disposed at the center thereof to be paired with the bearing holder 4. The bearing holder 6c has the same spherical inside surface as the bearing holder 4, and a bearing 7 having the same outside surface as the bearing 5 is fitted to the bearing holder 6c. Because of the spherical surfaces of the bearings 5 and 7 and the bearing holders 4 and 6c, the shaft 9 can be easily aligned to the center of the motor.

The bearing 7 is also paired with the bearing 5 to rotatably support the shaft 9. In more detail, the bearing 5 supports the front or left portion of the shaft 9, and the bearing 7 supports the rear or right end of the shaft 9. The rotor 8 includes an armature 10 and a commutator 11. The armature 10 is comprised of a magnetic core 10a and an armature coil (not shown). The axial center X of the core 10a is disposed a distance L off to the front or left side with respect to the axial center Y of the permanent magnets 3. Therefore, the armature 10 is pulled by the permanent magnets 3 to the right. Even if the motor and the shaft 9 is vibrated in the radial direction of the motor, the rear end 9b of the shaft 9 is always brought in contact with the inside surface of the cover 2 under pressure. The commutator 11 is disposed between the armature 10 and the rear bearing 7. The terminal holder 6a holds a high-side terminal 12a, and the terminal holder 6b holds a low-side terminal 12b. The terminals 12a and 12b extend outward from inside of the cover 2 in the axial direction of the motor.

A pair of brush springs 13 and 31 is fixed to the resinous support member 6 at a portion thereof around the commutator 11. The pair of brush springs 13 and 31 is made of a metal plate.

The brush spring 13 has an anchor portion 13a that is fixed to the resinous support member 6, a spring portion 13b that extends from an end of the anchor portion 13a in the radial direction of the motor to the commutator 11 and a connection bar 13c that extends from the other end of the anchor portion 13a. The anchor portion 13a extends in the axial direction and held between two members of the resinous support member 6, and the connection bar 13c is connected to the inside end of the terminal 12a. The anchor portion 13a, the spring portion 13b and the connection bar 13c are cut from the same metal plate.

The brush spring 31 also has an anchor portion 31a that is fixed to the resinous support member 6 in the same manner as the anchor portion 13a, a spring portion 31b that extends from an end of the anchor portion 31a to the commutator 11 and a connection bar 31c that extends from the other end of the anchor portion 31a, which also contacts the inside surface of the cover 2. The connection bar 31c is connected to the inside or left end of the terminal 12b.

Each of the spring portions 13b and 31b has a brush 15 at the tip thereof, which is brought in contact with the commutator 11 under pressure.

The terminal 12a and the brush spring 13 are disposed in the high-side circuit, and the terminal 12b and the brush spring 31 are disposed in the low-side or ground level circuit.

When a DC voltage is applied across the terminal 12a and the terminal 12b, DC power is supplied to the armature 10 through the brush springs 13 and 31, brushes 15 and the commutator 11 to rotate the rotor 8.

Although the brush 15 and the commutator 11 generate electric noises, the motor case 1 and the cover 2 prevent electro-magnetic noises from radiating from the case 1. Because, the motor case 1 and the cover 2 are grounded through the brush spring 31 and the terminal 12b that are connected to the ground level circuit. Although the front end 9a of the shaft 9 extends outward, the electro-magnetic noises do not radiate from the front end 9a because the rear end 9b is connected to the cover 2 that is grounded.

Figure 2:
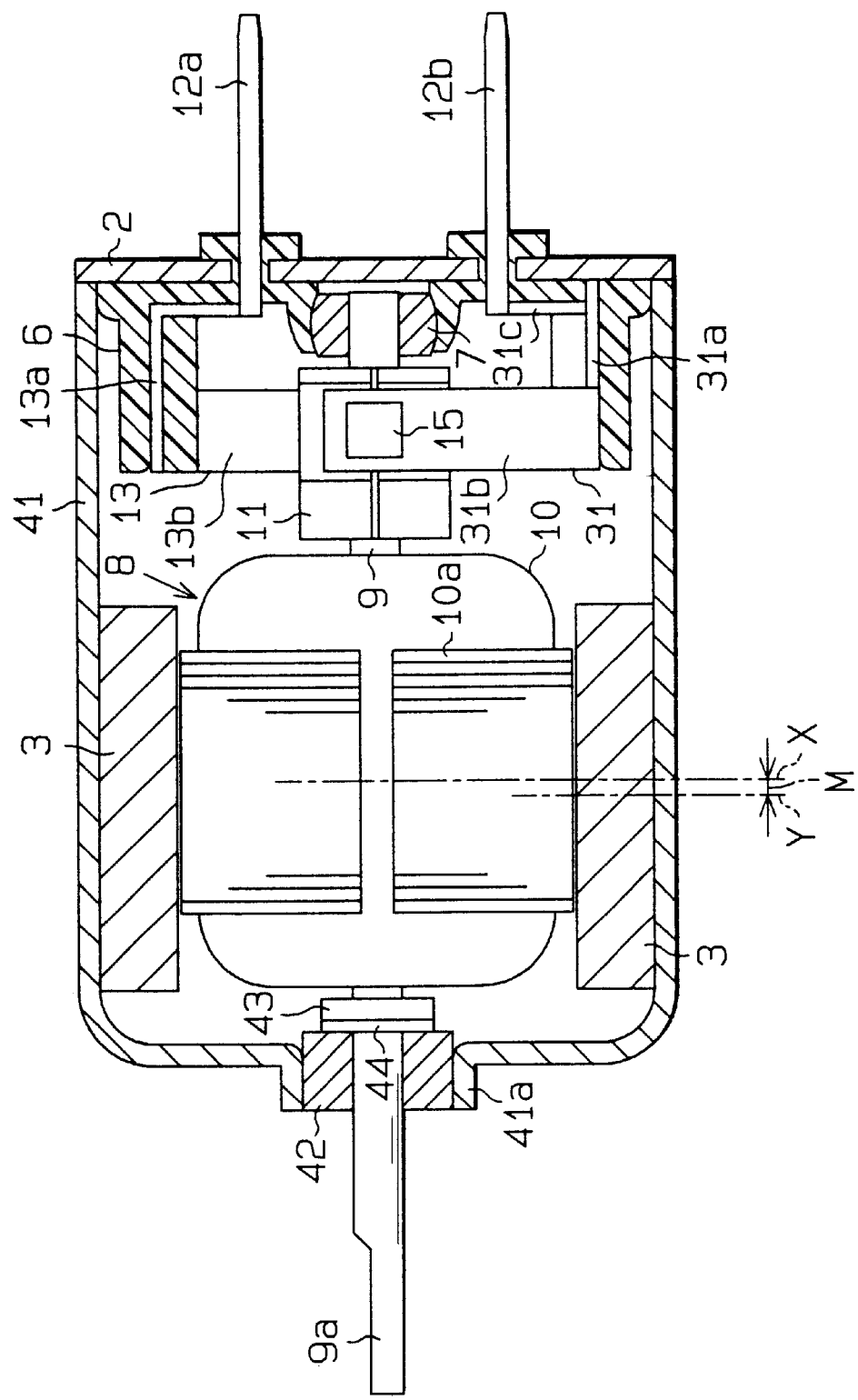
FIG. 2 is a cross-sectional view of a main portion of a DC motor according to a second embodiment of the invention.

A DC motor according to a second embodiment of the invention is described with reference to FIG. 2.

In the meantime, the same reference numeral in the following drawings corresponds to the same portion or component as shown in FIG. 1.

The DC motor according to the second embodiment is comprised of a cup-shaped cylindrical motor case 41 that has a small cylindrical portion 41a at the center of the bottom thereof. The motor case 41 is made of a conductive magnetic material (iron sheet), and a conductive bearing 42 is fitted to the inside of the small cylindrical portion 41a. A shaft collar 43 is formed at the shaft 9 between the armature 10 and the bearing 42, and a conductive washer 44 is disposed between the bearing 42 and the shaft collar 43.

The axial center X of the core 10a is disposed a distance M off to the rear or right side with respect to the axial center Y of the permanent magnets 3. Therefore, the armature 10 is pulled by the permanent magnets 3 to the left. Even if the motor and the shaft 9 is vibrated in the radial direction of the motor, the front end of the washer 44 is always brought in contact with the inside surface of the cover 2 under pressure.

Figure 3:
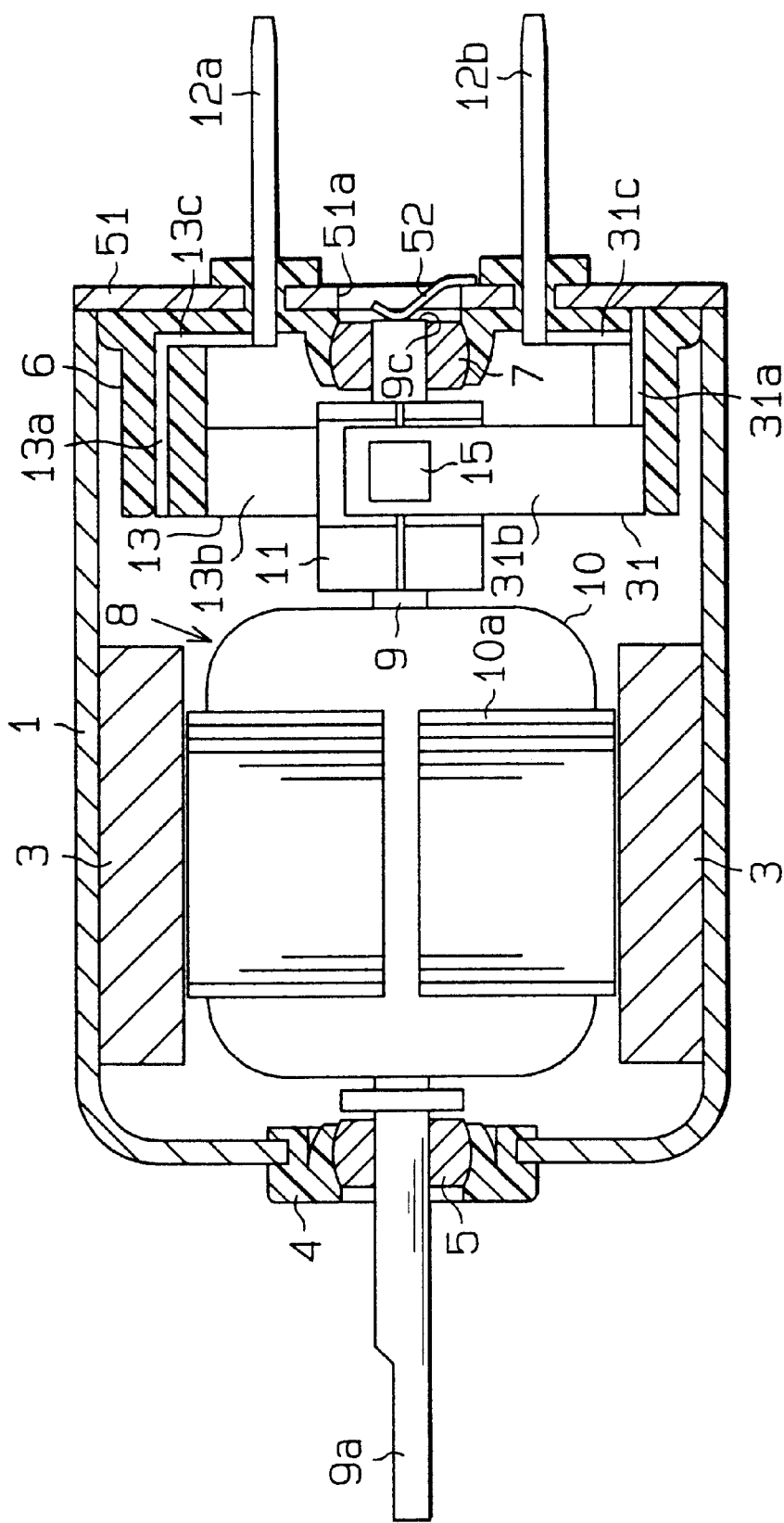
FIG. 3 is a cross-sectional view of a main portion of a DC motor according to a third embodiment of the invention.

A DC motor according to a third embodiment of the invention is described with reference to FIG. 3.

The cover 2 of the first embodiment is replaced with a cover 51. The cover 51 has a center through hole 51a. A resilient conductive contact member 52 is fixed to the cover 51 so that an end thereof can be pressed against the rear end surface 9c of the shaft 9. Even if the motor and the shaft 9 is vibrated in the radial direction of the motor, the rear end of the shaft is always brought in contact with the cover 51 under pressure. Therefore, it is not necessary to arrange the axial position of the armature with respect to the permanent magnets.

Figure 4:
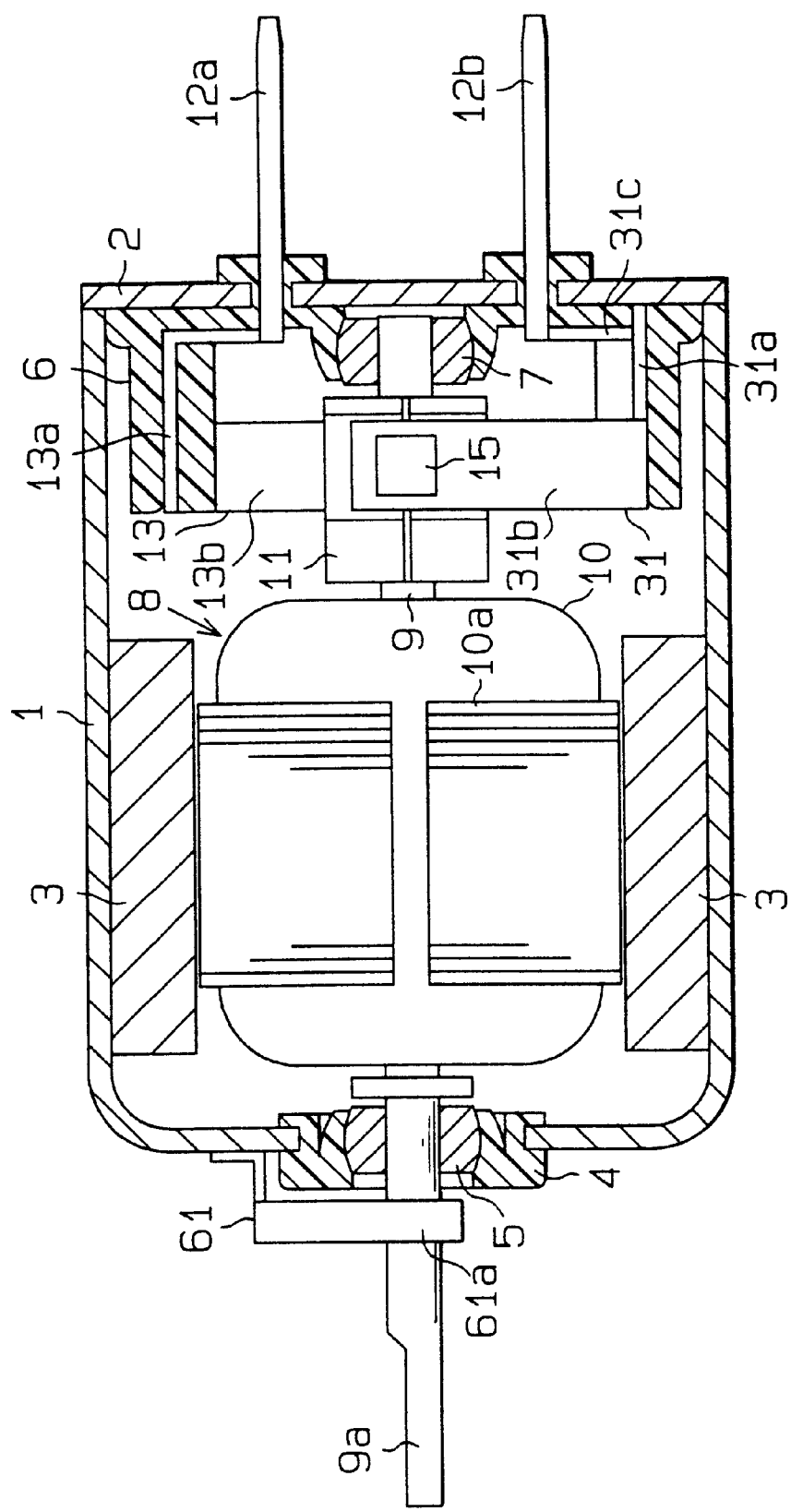
FIG. 4 is a cross-sectional view of a main portion of a DC motor according to a fourth embodiment of the invention.
Figure 5:
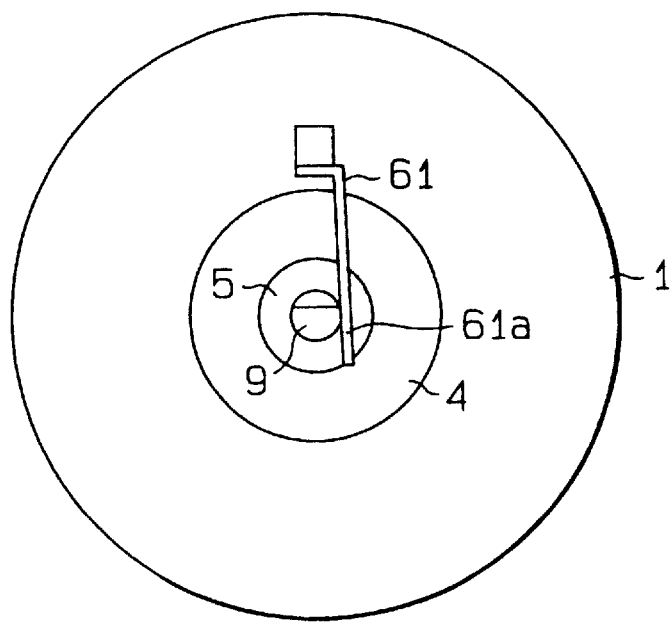
FIG. 5 is a front view illustrating a contact member of the DC motor according to the fourth embodiment.

A DC motor according to a fourth embodiment of the invention is described with reference to FIGS. 4 and 5.

A contact member 61 is fixed to the bottom of the motor case 2 instead of the shaft's rear end 9b of the first embodiment. The contact member 61 is made of a resilient conductive plate having an end 61a in contact with the outer periphery of the shaft 9 under pressure. Therefore it is not necessary to arrange the axial position of the armature with respect to the permanent magnets.

Figure 6:
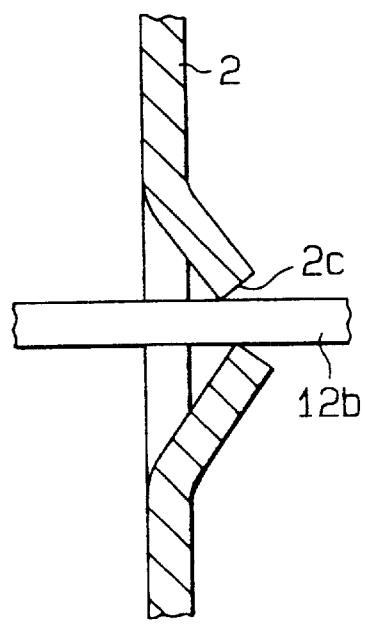
FIG. 6 is an enlarged fragmentary cross-sectional side view illustrating a contact member of a DC motor according to a fifth embodiment of the invention.

A DC motor according to a fifth embodiment of the invention is described with reference to FIG. 6.

Instead of the through hole 2b and the connection bar 31c of the low-side brush spring 31 connected to the cover 2 of the first embodiment, the cover 2 has a cut-and-raised portion 2c that resiliently contacts the low-side terminal 12b.

A DC motor according to a sixth embodiment of the invention is described with reference to FIGS. 7A and 7B–FIG. 9.

The DC motor is integrated into a pump unit. A motor case 71 is comprised of a cup-shaped member made of a conductive magnetic plate. The motor case 71 has a small cylindrical portion 71a projecting outward from the bottom thereof. The cylindrical portion 71a has a partly spherical inside surface 71b. A bearing-holding washer 72, which has a partly spherical or conical inside surface 72a, is fixed to the inside surface 71b. The bearing 5 is held between the spherical or conical inside surfaces 71b and 72a, so that the shaft 9 is rotatably supported by the bearings 5 and 7.

The motor is accommodated in a pump housing 73. The pump housing 73 has a cavity 73a to which the motor case 1 is fitted. A through hole 73b is formed at the bottom of the pump housing 73, and an oil seal 74 is inserted therein. The front end 9a of the shaft 9 extends outward from the pump housing 73 through the oil seal 74.

Figure 9:
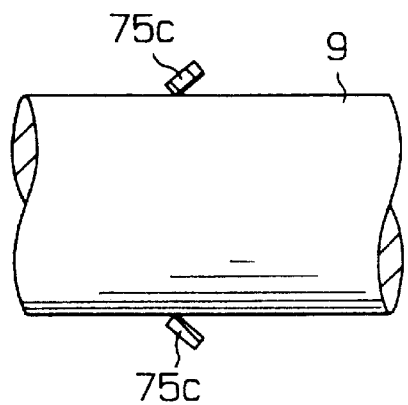
FIG. 9 is a schematic diagram illustrating the contact member in contact with a shaft of the DC motor according to the sixth embodiment.

A conductive earth plate 75 is fixed to the outside surface of the bottom of the motor case 1. As shown in FIGS. 8A and 8B, the earth plate 75 has a disk portion 75a, a cylindrical portion 75b and a pair of contact portions 75c. The pair of contact portions 75c is disposed opposite to each other at a slightly shorter distance than the outside diameter of the shaft 9. As shown in FIG. 8B, the disk portion 75a has six slant spring arms 75d that are cut and extended from the disk portion 75a at circumferentially equal intervals. As shown in FIG. 7B, the disk portion 75a is held between the outside surface of the bottom of the motor case 71 and the pump housing 73. Because of the slant spring arms 75d, the disk portion 75a is securely connected to the motor case 71 even if there is a small gap between the motor case 71 and the pump housing 73. The cylindrical portion 75b is fitted to the through hole 73b, and the pair of the contact portions 75c contacts the outer periphery of the front end of the shaft 9 at an angle of about 180° from each other, as shown in FIG. 9. An impeller 6 is fixed to the front tip 9a of the shaft 9.

Even if the shaft 9 is vibrated at a high rotation speed, the pair of contact portions 75c completely follows the shaft 9 so that the shaft 9 can be securely grounded.

Figure 10:
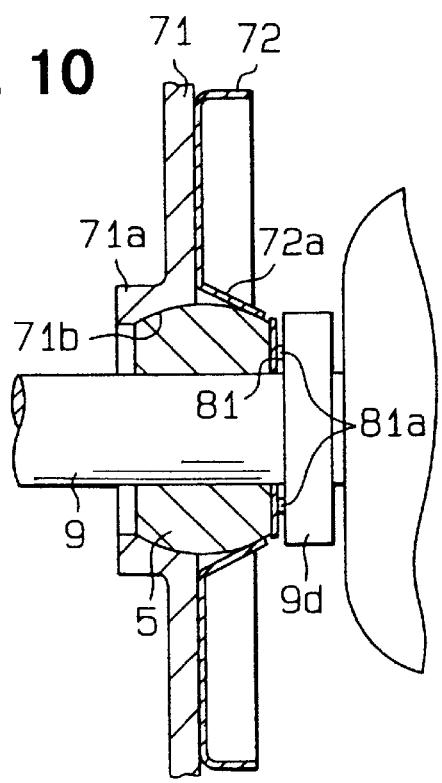
FIG. 10 is a fragmentary enlarged cross-sectional view of a main portion of a DC motor according to a seventh embodiment of the invention.
Figure 11A:
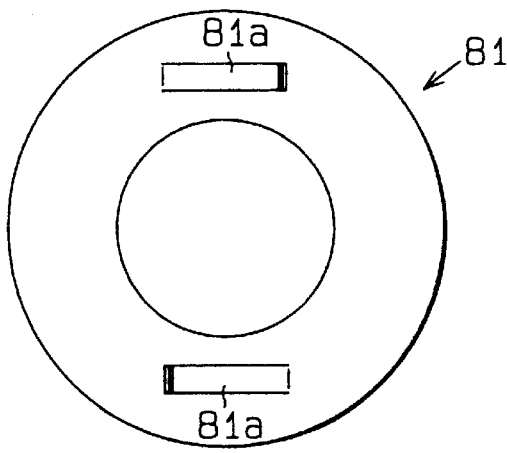
FIG. 11A is a plan view of a conductive washer of the DC motor according to the seventh embodiment of the invention.
Figure 11B:
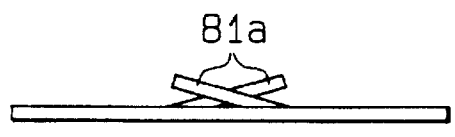
FIG. 11B is a side view of the washer shown in FIG. 11B.

A DC motor according to a seventh embodiment of the invention is described with reference to FIG. 10 and FIGS. 11A and 11B.

Rather than the earth plate 75 of the DC motor according to the sixth embodiment shown in FIG. 7, a conductive washer 81 is disposed between the bearing and a collar 9d formed on the shaft 9. The washer 81 has a pair of spring arms 81a cut and extended from the annular base portion thereof. The washer 81 is fit to the outer periphery of the shaft 9. Because of the pair of spring arms 81a, the washer 81 can securely contact both the collar 9d and the bearing 5 even if there is a small gap between the collar 9d and the bearing 5.

Figure 12:
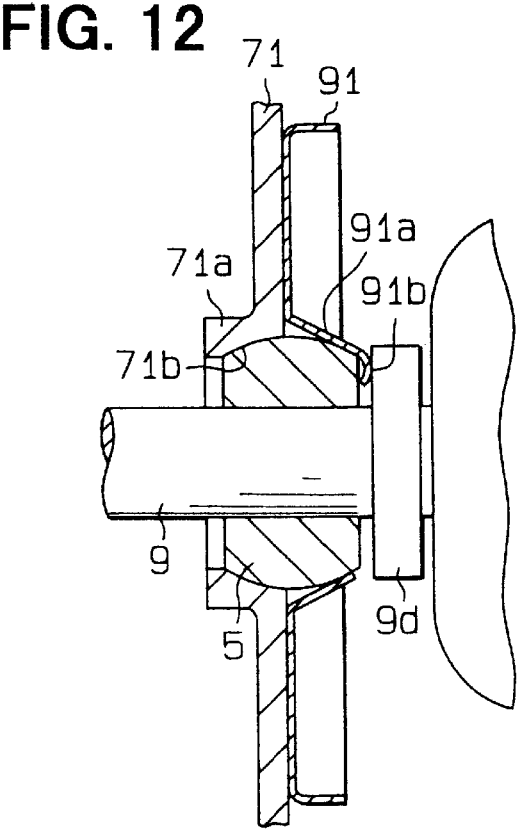
FIG. 12 is a fragmentary enlarged cross-sectional view of a main portion of a DC motor according to an eighth embodiment of the invention.

A DC motor according to an eighth embodiment of the invention is described with reference to FIG. 12.

In this embodiment, the earth plate 75 of the DC motor according to the sixth embodiment shown in FIG. 7 is omitted. A bearing-fixing washer 91 is disposed between the bearing 5 and the collar 9d formed on the shaft 9. The washer 91 is made of a conductive disk plate that has a conical or spherical inside surface 91a at the center thereof and a plurality of resilient contact arms 91b that extends from the rear end of the bearing-fixing washer 91 along the rear surface of the bearing 5. Accordingly, the contact arms 91b are pressed against the front surface of the collar 9d. In other words, the contact arms 91d respectively extend from the rear end of the bearing-fixing washer 91 radially inward into the gap between the bearing 5 and the shaft collar 9d and compressed by the bearing 5 and the collar 9d. The contact arms 91b securely contact the collar 9d and the bearing 5. Because the contact arms 91a are formed from a portion of the washer 91, no additional member is necessary to ground the shaft 9. Further, the contact arms are automatically lubricated by lubrication oil oozing from the bearing 5.

Variations of the eighth embodiment of the invention are respectively described with reference to FIGS. 13–15.

Figure 13:
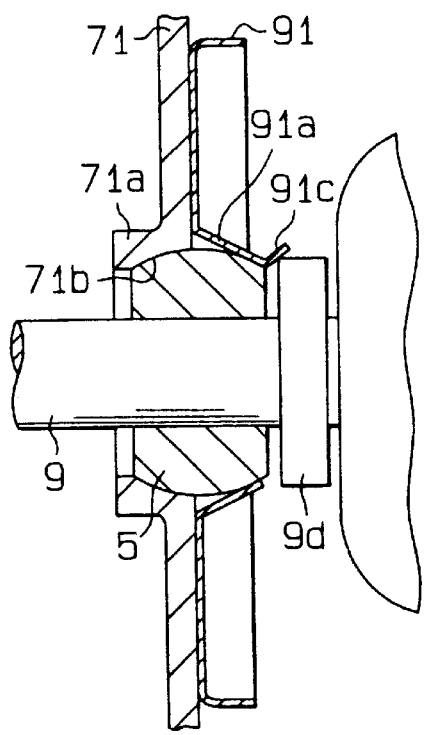
FIG. 13 is a fragmentary enlarged cross-sectional view of a main portion of a DC motor according to a variation of the eighth embodiment of the invention.

The contact arms 91b can be substituted by resilient contact arms 91c, as shown in FIG. 13. The contact arms 91c slantwise extend from the rear end of the bearing-contact washer 91 radially outward to press against the outer periphery of the shaft collar 9d.

Figure 14:
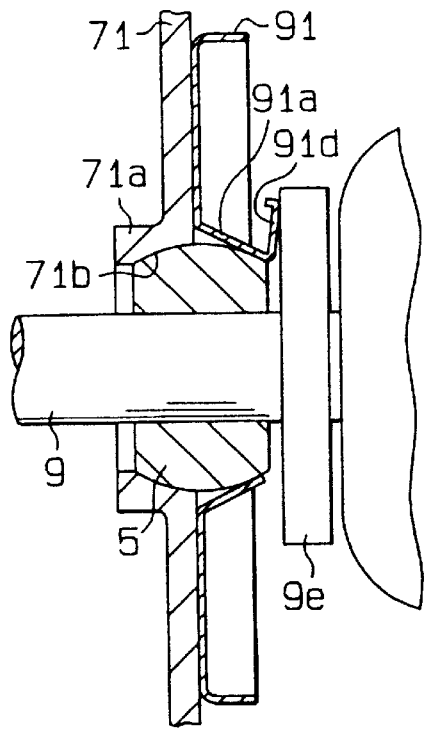
FIG. 14 is a fragmentary enlarged cross-sectional view of a main portion of a DC motor according to a variation of the eighth embodiment of the invention.

The contact arms 91b and the shaft collar 9d can be substituted by resilient contact arms 91d and a shaft collar 9e, as shown in FIG. 14. The contact arms 91d extend radially outward from the rear end of the bearing-contact washer 91 to press the front surface of the shaft collar 9e. For this purpose, the outside diameter of the shaft collar 9d is much larger than the outside diameter of the bearing 5.

Figure 15:
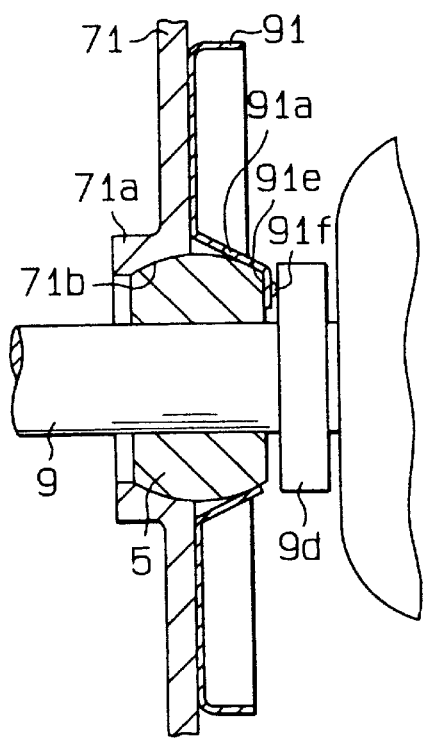
FIG. 15 is a fragmentary enlarged cross-sectional view of a main portion of a DC motor according to a variation of the eighth embodiment of the invention.

The contact arms 91b can be also substituted by resilient contact arms 91e, as shown in FIG. 15. The contact arms 91e extend from the rear end of the bearing-contact washer 91 radially inward into the gap between the bearing 5 and the collar 9d. The contact arms have a plurality of resilient semispherical projections 91f on the rear surface thereof that are pressed against the front surface of the shaft collar 9d.

Figure 16:
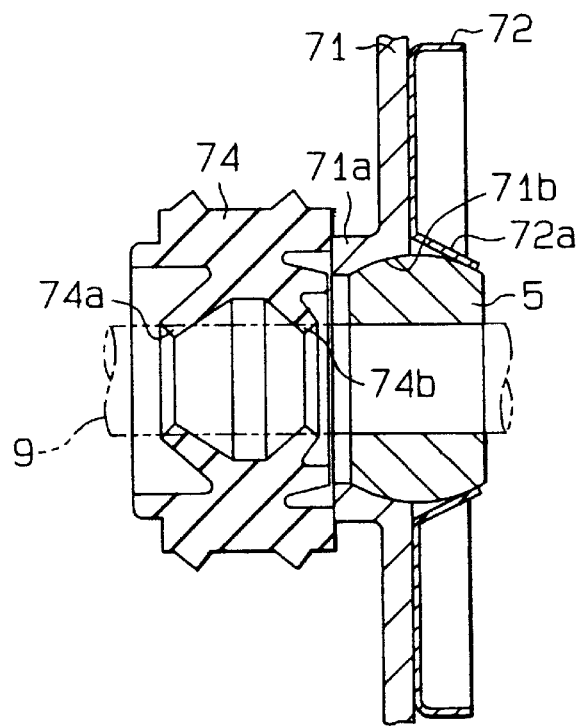
FIG. 16 is a fragmentary enlarged cross-sectional view of a main portion of a DC motor according to a ninth embodiment of the invention.

A DC motor according to a ninth embodiment of the invention is described with reference to FIG. 16.

The earth plate 75 of the DC motor according to the sixth embodiment shown in FIG. 7 is omitted. The oil seal 74 is made of a conductive material, and the oil seal 74 disposed in contact with the motor case 71. The conductive material of the oil seal 74 is a compound of rubber and conductive powder. The oil seal 74 has ring-shaped lips 74a and 74b to which the shaft 9 is press-fitted and a flat rear surface in contact with the small cylindrical portion 71a.

The conductive oil seal can be also formed of a nonconductive rubber oil seal and a conductive film that covers a portion of the oil seal to connect the shaft 9 and the motor case 71.

A DC motor according to a tenth embodiment of the invention is described with reference to FIGS. 17A–18B.

Figure 17A:
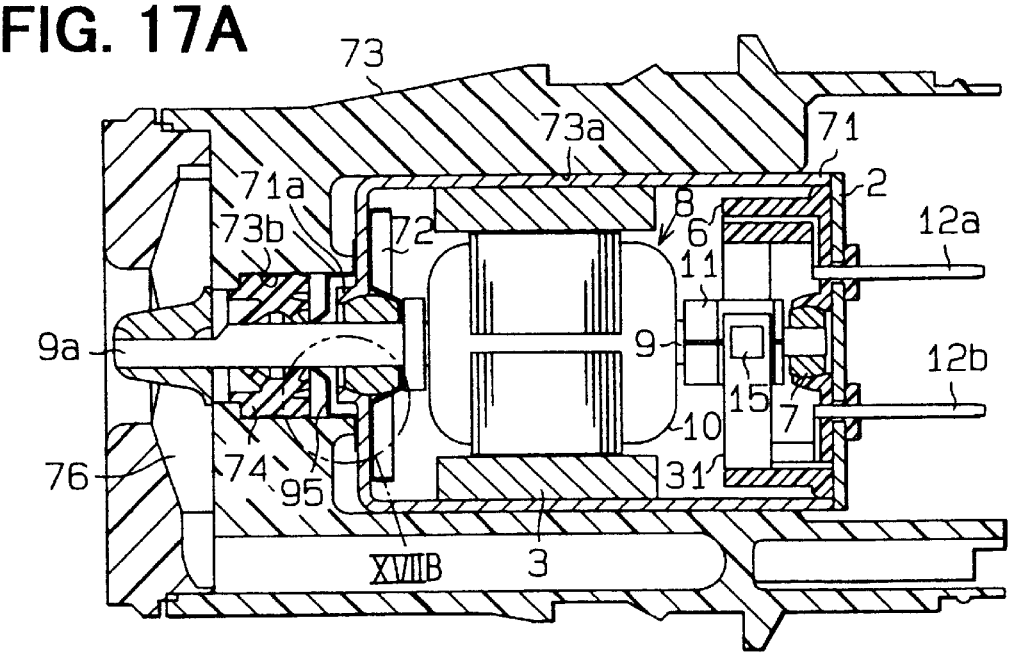
FIG. 17A is a cross-sectional view of a main portion of a DC motor according to a tenth embodiment of the invention.
Figure 17B:
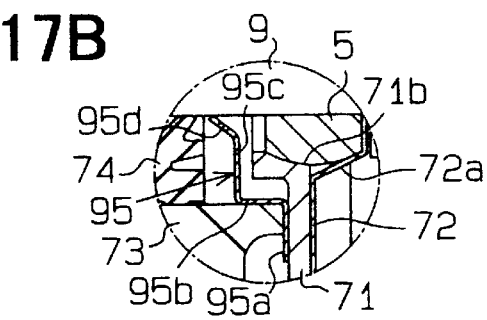
FIG. 17B is a fragmentary enlarged view of a contact member of the DC motor shown in FIG. 17A.
Figure 18A:
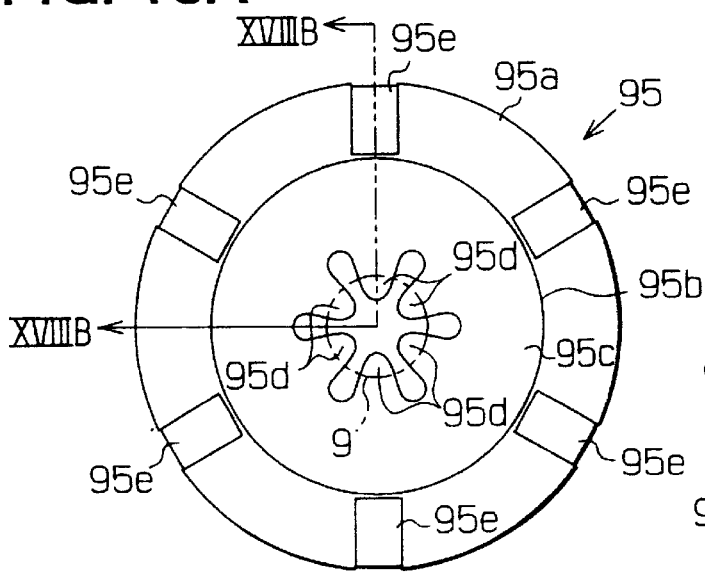
FIG. 18A is a front view of the contact member of the DC motor according to the tenth embodiment.
Figure 18B:
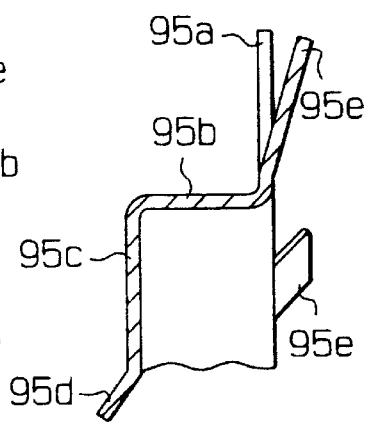
FIG. 18B is a fragmentary enlarged cross-sectional side view of a main portion of the contact member shown in FIG. 18A.

The earth plate 75 of the DC motor according to the sixth embodiment shown in FIG. 7 is substituted by another earth plate shown in FIGS. 18A and 18B. The earth plate 95 has a disk portion 95a, a cylindrical portion 95b that projects forward from the disk portion 95a, a bottom portion 95c having six radially extending contact tongues 95d. The contact tongues 95d slantwise extend forward from the bottom portion to the shaft 9. As shown in FIG. 18A, the tip ends of the six contact tongues form an inscribed circle that has a smaller diameter than the outside diameter (represented by a two-dot-chain line) of the shaft 9. The disk portion 95a has six slant spring arms 95e at circumferentially equal intervals. The disk portion 95a is held between the outside surface of the motor case 71 and the pump housing 73, as shown in FIG. 17B. Because of the spring arms 95e, the disk portion is securely connected to the motor case 71. The cylindrical wall portion 95b is fitted to the through hole 73b, and the shaft 9 is inserted into the inscribed circle formed by the six contact tongues 95d. Therefore, the contact tongues 95d are bent and pressed against the shaft 9, so that the shaft 9 can be grounded through the earth plate 95, the motor case 71 and the cover 2. The number of the contact tongues may be changed from six to four, eight or any other number as desired.

Figure 19:
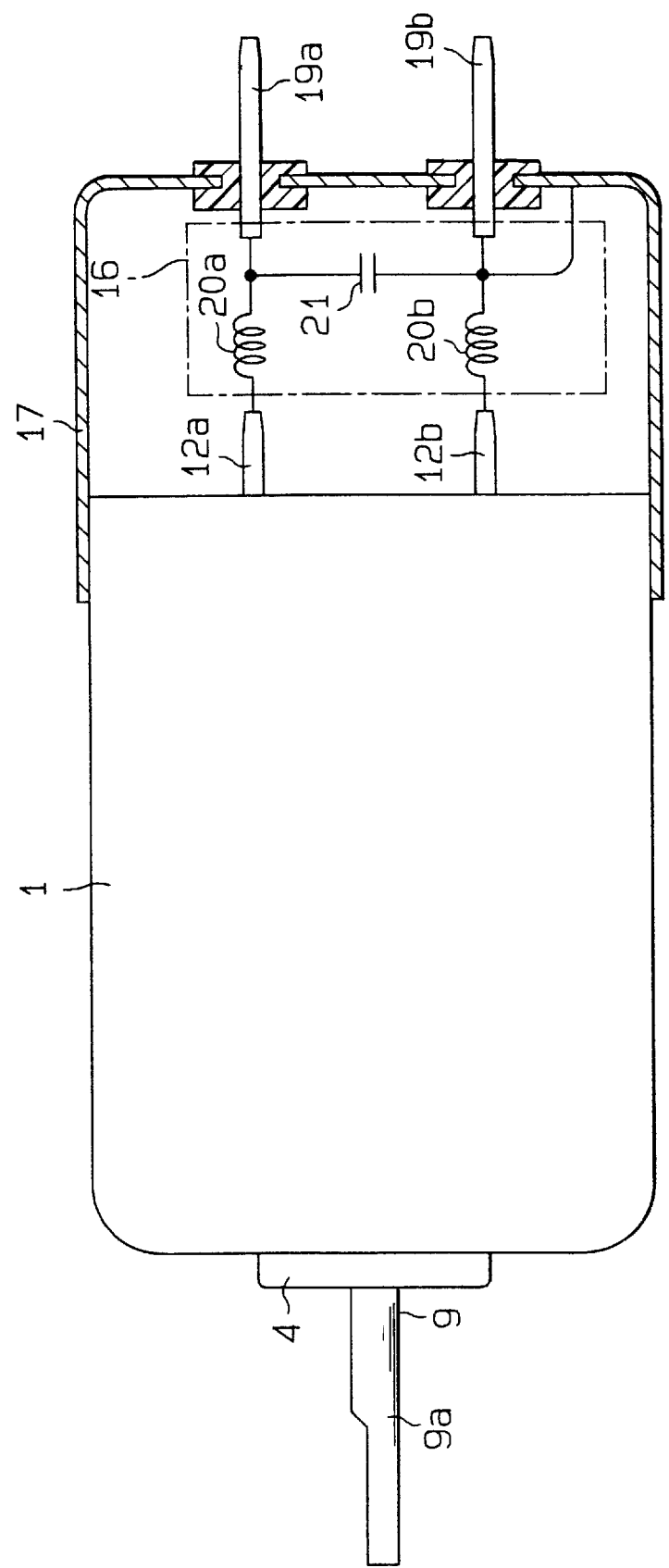
FIG. 19 is a schematic diagram of a DC motor including a noise suppressing circuit.

As shown in FIG. 19, a noise suppressing circuit 16 that includes a pair of coils 20a and 20b and a capacitor 21 can be connected to the pair of terminals 12a and 12b of one of the DC motor according to the embodiments described above. The noise suppressing circuit 16 is accommodated in a circuit case 17 that has a pair of external pins 19a and 19b respectively connected to the noise suppressing circuit 16. The coil 20a is connected between the external pin 19a and the high-side terminal 12a, and the coil 20b is connected between the external pin 19b and the low-side terminal 12b. The capacitor 21 is connected across the external pins 19a and 19b.

If a DC voltage is applied across the external pins 19a and 19b, direct current is supplied from the external pin 19a through the coil 20a, the high-side terminal 12a, the high-side brush spring 13, the high-side brush 15, the commutator 11, the armature 10, the commutator 11, the low-side brush 15, the low-side brush spring 14, the low-side terminal 12b and the coil 20b to the external pin 19b. Although electromagnetic noises are generated between the brushes and the commutator, the noises are reduced by the noise suppressing circuit.

The invention described above can be applied to various rotary electric machines, such as an induction motor or other type of AC motor, as far as it has a case and a rotor accommodated in the case.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention is to be regarded in an illustrative, rather than a restrictive, sense.

What is claimed is:

1. A motor comprising:
   a rotor;
   an armature coil;
   a conductive case for accommodating said rotor;
   a grounding member for grounding said conductive case;
   a shaft having a portion extending outward from conductive case;
   a bearing fixed to said case for rotatably supporting said shaft;
   a housing for fixing said conductive case;
   means, including a conductive member in contact with said shaft and said conductive case, for pressing said conductive member between said shaft and said conductive case, wherein said means comprises:
      a resilient contact member integrated with said conductive case; and
      a parallel pardon extending in a parallel direction to said shaft;
      a slant portion slanting toward a center of said shaft; and
      a disk portion held between said conductive case and said housing, wherein said disk portion comprises a plurality of slanted spring members.

2. The motor as claimed in claim 1, wherein
   said means comprises a resinous bearing holder for holding said bearing,
   said bearing has a spherical outer surface, and
   said bearing holder has a spherical inner surface to which said bearing is fitted.

3. A motor comprising:
   a rotor;
   an armature coil;
   a conductive case for accommodating said rotor;
   a grounding member for grounding said conductive case;
   a shaft having a collar and a portion extending outward from said conductive case;
   a bearing directly fixed to said case for rotatably supporting said shaft;
   a housing for fixing said conductive case;
   means, including a conductive member in contact with said shaft and said conductive case, for pressing said conductive member between said shaft and said conductive case, wherein said means comprises a spring washer held between said bearing and said collar.

4. The motor as claimed in claim 3, further comprising
   a bearing-holding washer having a resilient projecting member, wherein
   said means comprises resilient projecting member.

5. The motor as claimed in claim 3, further comprising
   a housing for fixing said case, wherein
      said means further comprises a disk portion held between said case and said housing.

6. The motor as claimed in claim 5, wherein
   said disk portion comprises a plurality of slanted spring members.

7. A motor comprising:
   a rotor;
   an armature coil;
   a conductive case for accommodating said rotor;
   a grounding member for grounding said conductive case;
   a shaft having a portion extending outward from said conductive case;
   a bearing fixed to said case for rotatably supporting said shaft;
   a housing for fixing said conductive case; and
   means, including a conductive member in contact with said shaft and said conductive case, for pressing said conductive member between said shaft and said conductive case, wherein said means comprises a conductive seal member disposed between said shaft and said conductive case.

8. A motor comprising;
   a rotor;
   an armature coil;
   a conductive case for accommodating said rotor;
   a grounding member for grounding said conductive case;
   a shaft having a portion extending outward from said conductive case;
   a bearing fixed to said case for rotatably supporting said shaft;
   means, including a conductive member in contact with said shaft and said conductive case, for pressing said conductive member between said shaft and said conductive case, wherein said means comprises:
      a parallel portion extending in a parallel direction to said shaft;

a slant portion slanting toward a center of said shaft; and a disk portion held between said conductive case and said housing, wherein said disk portion comprises a plurality of slanted spring members.

9. A motor comprising:

a rotor;

an armature coil;

a conductive case for accommodating said rotor;

a grounding member for grounding said conductive case;

a shaft having a portion extending outward from said conductive case;

a bearing fixed to said case for rotatably supporting said shaft; and means, including a conductive member in contact with said shaft and said conductive case, for pressing said conductive member between said shaft and said conductive case, wherein said means comprises a plurality of members surrounding said shaft at equal intervals.

* * * * *